June 2, 1931.   J. T. MOORE   1,807,926
WHEEL GUIDE FOR TRACTION CHAINS
Filed April 6, 1929

Inventor
John Turner Moore
By Chunel Shumey
his Attorneys

Patented June 2, 1931

1,807,926

UNITED STATES PATENT OFFICE

JOHN TURNER MOORE, OF READING, PENNSYLVANIA, ASSIGNOR, BY MESNE ASSIGNMENTS, TO REX-WATSON CORPORATION, OF CANASTOTA, NEW YORK, A CORPORATION OF NEW YORK

WHEEL GUIDE FOR TRACTION CHAINS

Application filed April 6, 1929. Serial No. 353,182.

This invention relates to improvements in endless track mechanisms of the type used on tractors and consisting of a series of articulated tread links that form an endless chain constituting the surface on which the wheels of the tractor or other vehicle travel.

Each link of the series of links has what will be called a tread portion, one surface of which engages the ground while the other surface supports the wheels of the vehicle. This wheel supporting surface is the upper surface and as the links travel around the wheels they must be held against any appreciable movement axially of the wheels or laterally of the periphery of the wheels. In prior structures these means for limiting such movement of the links have usually taken the form of guide ribs or projections on the wheel supporting surfaces of the links that are adapted to contact with the wheels at their peripheries. However, in such structures as these, the relative movements of the projections and wheels are such that the parts wear rather rapidly so that it is necessary to frequently replace the links because of the increased lateral play permitted the links by such wear. Accordingly, the primary object of the present invention is to reduce the wear on the guide members, thereby maintaining a proper working relation between the links and wheels over a longer period of time and consequently increasing the life of the links. The invention, in its broader aspect, is also illustrated in applicant's co-pending application Serial No. 342,812.

A further object of the invention is to provide guide members on the frame supported by the wheels, these guide members co-operating with other guides on the links. In this way the contacting guide members may be located at a point spaced radially inward from the peripheries of the wheels.

Another object of the invention is the utilization of anti-friction elements for the guides, a feature which also adds to the life of the links.

With these and other objects in view, the invention consists in certain novel details of construction and combinations and arrangements of parts, all as will be hereinafter more fully described and the novel features thereof particularly pointed out in the appended claims.

In the accompanying drawings,—

Figure 1:
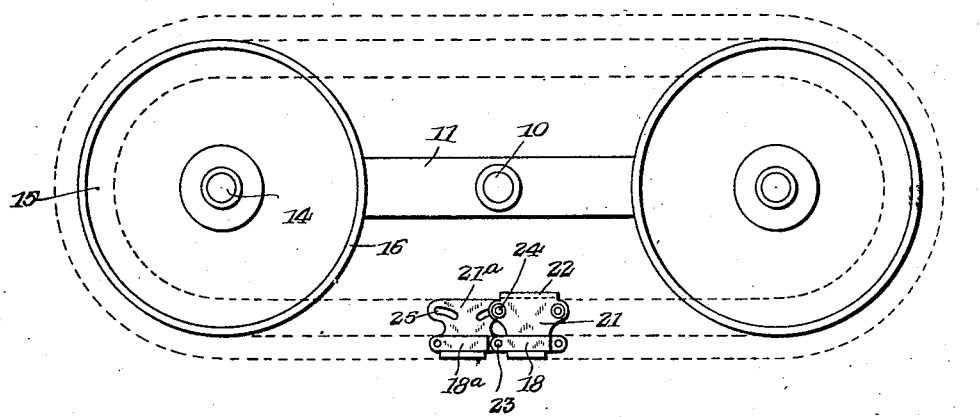
Figure 1 is a diagrammatical view illustrating the spaced side wheels of an ordinary type of cart with an endless link belt track extending around said wheels, a pair of links only being shown and the remainder indicated by dotted lines.
Figure 2:
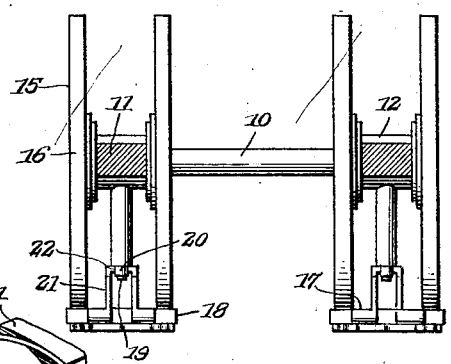
Fig. 2 is a sectional view taken transversely of Figure 1.

As is customary, the vehicle comprises a supporting axle 10 for a cart or other type of body and mounted on said axle are the axially spaced wheel supporting frames 11, the ends of which are of tubular formation as indicated at 12. Freely journaled in these tubular portions on suitable anti-friction elements 13 are the axles 14 for the wheels 15, said wheels having comparatively broad peripheries 16 for engagement with the wheel supporting surfaces 17 of the chain links 18, 18a. As is clearly understood, these chain links 18, 18a, form endless belts that extend around the front and rear wheels 15 of each frame, the belts constituting endless ground engaging tracks for the wheels. Belts of this nature are well known and, as above pointed out, the present invention relates to an improved construction of wheel and belt link guiding means for properly limiting lateral movement of the links relative to the peripheries of the wheels as they pass around the latter.

Limiting means of this nature are broadly old, but in most instances they have been located at the peripheries of the wheels, but the difficulty with such construction is that at this point there is considerable relative movement of the links and wheels as the links come into contact with and move out of contact with the wheels. To reduce this relative movement of the said parts, and thereby reduce the wear imposed upon them, the present invention contemplates the provision of guide means for the links that will engage one another at points spaced radially inward from the peripheries of the wheels. This can be accomplished in various ways and has been claimed broadly in applicant's co-pending application above identified. In the present invention, the same result is obtained by means of guides formed on the wheel supporting frames 11.

As shown, these guiding means are in the form of posts 19 projecting radially of the wheel from the tubular portion 12 of the wheel supporting frame and rotatably secured on each post 19 is an anti-friction member 20 that serves as the guiding means adapted to cooperate with guiding means on the links themselves. In the particular form of the invention illustrated the female links 18 are formed with upstanding ribs 21 spaced apart laterally of the link and the surfaces 22 of said ribs 21 constitute guide surfaces between which the guide members on the frame project. The rollers 20 on posts 19 on the frame engage the surfaces 22 on ribs 21 of the links and, as will be appreciated, limit movement of said links laterally of the wheels.

Figure 3:
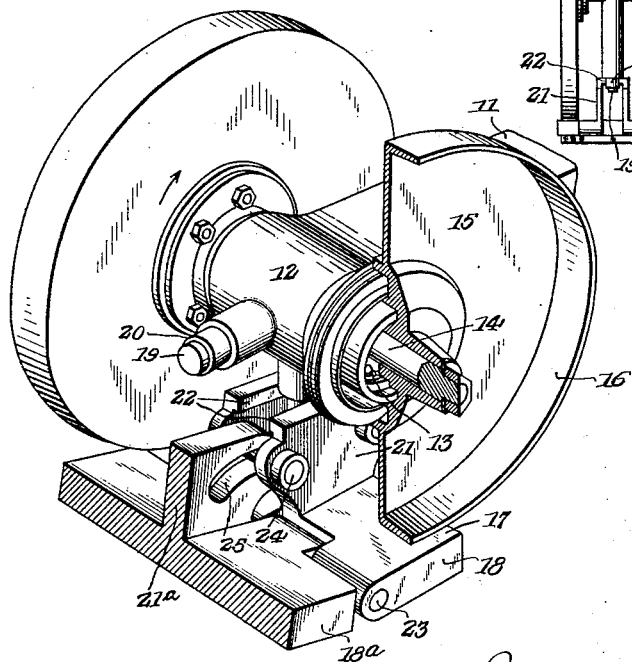
Fig. 3 is a perspective view, partly in section, of a pair of the supporting wheels and a portion of the frame and link belt.

If desired, two posts 19 and anti-friction members 20 may be provided on each tubular portion of the frame. Such an arrangement is shown in Fig. 3, the posts being spaced on the tubular portion 12 circumferentially of the wheels. It should be mentioned that in the present form of the invention the male links 18a have no guide members formed thereon and the ribs 21a thereof should be of a reduced height that will permit them to clear the ends of post 19.

Except as described above, the construction of the links is immaterial so far as the present invention is concerned. Therefore, it need only be stated that the tread portions of the links are connected together by hinge pins 23 and the upstanding ribs 21 of the female links are connected to the ribs 21a on the male links by pins 24 which are free to move in slots 25 in said ribs 21a.

With the present construction, wear on the guide surfaces of the links is reduced to a considerable extent, by reason of the fact that the point at which they are engaged by the cooperating guides on the frame is located radially inward from the peripheries of the wheels or at a point where there is not much relative movement of the guide members as the links move out of contact with the wheels. Furthermore, the wear on the links is reduced by reason of the fact that the present construction permits the use of the anti-friction members 20 as guide members.

What I claim is:

1. In an endless track mechanism, the combination of a frame, a pair of axially spaced wheels journaled in said frame, a series of articulated links adapted to travel around said wheels, an upstanding flange on each alternate link in said series, a pair of laterally spaced guide flanges on the other alternate link of said series, and a guide member on said frame located between said wheels adapted to project between the guide flanges of the last mentioned alternate links and adapted to pass over the upper edges of the flanges on the first mentioned alternate links.

2. In an endless track mechanism, the combination of a frame, a pair of axially spaced wheels journaled in said frame, a series of articulated links adapted to travel around said wheels, an integral upstanding flange on each alternate link in said series, a pair of laterally spaced guide flanges formed integrally on the other alternate links in said series, pivot pins directly connecting the juxtaposed ends of the flanges of each pair of contiguous links, and a guide member on said frame located between said wheels and adapted to project between the laterally spaced guide flanges of the second mentioned set of alternate links.

JOHN TURNER MOORE.